United States Patent [19]
Sahara

[11] 3,813,681
[45] May 28, 1974

[54] MOTOR DRIVEN PHOTOGRAPHIC CAMERA

[75] Inventor: Masayoshi Sahara, Osaka, Japan

[73] Assignee: Minolta Camera Kabushiki Kaisha, Osaka, Japan

[22] Filed: Mar. 12, 1973

[21] Appl. No.: 340,138

[30] Foreign Application Priority Data
Mar. 13, 1972 Japan............................ 47-24706

[52] U.S. Cl.................. 354/173, 354/204, 242/71.5
[51] Int. Cl. ........................................... G03b 19/04
[58] Field of Search......... 95/31 EL, 31 AC, 53 EA; 242/71.5, 71

[56] References Cited
UNITED STATES PATENTS
| | | | |
|---|---|---|---|
| 3,613,542 | 10/1971 | Wiessner et al. | 95/31 EL |
| 3,640,201 | 2/1972 | Kimura | 95/31 EL |
| 3,688,669 | 9/1972 | Ogiso et al. | 95/31 AC |
| 3,705,338 | 12/1972 | Tsujimoto et al. | 95/31 EL X |

*Primary Examiner*—Robert P. Greiner
*Attorney, Agent, or Firm*—Wolder & Gross

[57] ABSTRACT

A motor driven camera having a motor for driving the shutter releasing and film-winding mechanisms and capable of periodically repeating a predetermined cycle of operation is provided with a mechanism for automatically prolonging the cycle of operation when it fails to provide a correct exposure due to insufficient luminosity of a subject which requires a longer exposure time. The mechanism includes a first operating member which initiates the timing in association with shutter release and is actuated when a time corresponding to the predetermined cycle of operation has occurred and a second operating member which is actuated in relation to the completion of the exposure by the shutter, the motor operating the film winding mechanism when both of the first and second operating members are actuated.

12 Claims, 4 Drawing Figures

MOTOR DRIVEN PHOTOGRAPHIC CAMERA

BACKGROUND OF THE INVENTION

The present invention relates to an improved motor driven photographic camera wherein the shutter releasing and exposed film winding mechanisms are driven by an electric motor.

In a photographic camera of the above type, it is known to preset each cycle of photographing operation at a predetermined time interval for periodically repeating the photographing operation. Such camera, however, fails to give a correct exposure when the subject has a low luminosity which requires an exposure over a time period longer than that consumed by or programmed in the predetermined cycle of operation and thus an underexposed film frame results.

In order to eliminate the above drawbacks, it is necessary taking into consideration subjects of low luminosity, to program an exposure time longer than that required with subjects of normal luminosity in each cycle of operation. This results in an unduly long period of each cycle of operation which is highly undesirable in a camera of the subject type.

THE OBJECTS OF THE INVENTION

It is an object of the present invention to provide a motor driven photographic camera which will overcome the disadvantages explained above, wherein each single cycle of the successive photographing operations is set to have a short period suitable for a subject of normal luminosity in order not to consume excessive time for each cycle in the successive photographing operation, the period of the cycle being automatically prolonged when the subject has an abnormally low luminosity, in order to assure correct exposure.

It is another object of the present invention to provide a motor driven photographic camera, wherein the shutter releasing and film winding operations are effected by a drive motor and a cycle of photographing operation may be automatically repeated at predetermined time intervals, the period of each cycle being automatically prolonged when a subject has an abnormally low luminosity, in order to assure correct exposure.

It is a further object of the present invention to provide a motor driven photographic camera, wherein the shutter releasing and film winding operations are sequentially effected by a motor for successively repeating the photographing operation at time intervals necessary or sufficient for effecting correct exposures according to the level of luminosity of a subject.

SUMMARY OF THE INVENTION

With the above objects in view, the present invention provides a motor driven photographic camera wherein the shutter releasing and film winding mechanisms are driven by a motor, the camera having a device for automatically prolonging the period of each individual cycle of operation in successive photographing operations, the device including a first operating member which initiates a predetermined time interval upon release of the shutter and is actuated upon termination of the timing interval, and a second operating member which is actuated upon completion of exposure by the shutter, the motor operating the film winding mechanism when both of the first and second operating members are actuated concurrently.

In actual exposure of a camera, there is always a time lag between the release of the shutter button and the release of the front curtain in a camera with a focal plane shutter, or between the release of the shutter button and the commencement of rotation in an opening direction of shutter blades in a camera with a lens shutter. This time lag is variable with and determined by the particular kind of camera used. For example, in a single lens reflex camera, there is a time lag of about 30 milliseconds during which the mirror is moved from a viewing position to a picture taking position and/or the aperture of the lens diaphragm is adjusted by a diaphragm adjusting member. Thus, the above interval timer is not necessarily initiated concurrently with the start of exposure, and may be started in relation with the releasing operation of the camera by an additional interval.

In a timer which is started in relation with the releasing operation of the camera, the time $t$ during which the first operating member is actuated is obtained by subtracting the time lag $t_o$ required for the film winding operation from the predetermined period $T$ of each cycle in the successive photographing operation, as follows:

$$t = T - t_o.$$

With conventional cameras the time lag $t_o$ which is required for winding up the film is about 170 milliseconds. This means that when the period of one photographing cycle is 1 second, one-half second and one-third second, the time $t$ becomes 830 milliseconds, 330 milliseconds and 160 milliseconds, respectively.

Assuming that the period of one photographing cycle is preset at a rate of two frames per second, if the exposure is effected with a shutter speed of one one-hundredth second (10 milliseconds), the exposure completes 40 milliseconds after the shutter releasing operation, and upon completion of the exposure the second operating member is actuated. However, the film is not wound up at this instant, since the first operating member is not yet actuated. Thus, the exposure is effected fully for the time period of one one-hundredth second. It is only after a lapse of 330 milliseconds from the shutter releasing operation that the first operating member is actuated for winding up the exposed film. In the successive photographing sequence after a further lapse of 170 milliseconds, the releasing operation of the period of the succeeding photographing cycle is initiated to repeat the same operation cycle as described above.

However, if the subject has a low luminosity a shutter speed of one-half second (500 milliseconds) in order to give a correct exposure, the first operating member is actuated automatically after a lapse of 330 milliseconds from the start of the shutter releasing operation and therefore the film winding operation is started prematurely at this instant in the conventional type motor driven cameras which are not provided with the second operating member. However, at the time when the second operating member is actuated, the exposure has not yet been completed and therefore the photographing operation results in improper functioning or underexposure.

According to the present invention, however, the film winding operation is not started before the completion of the exposure, since the second operating member is not actuated until then. After a lapse of 530 milliseconds from the start of shutter releasing operation or upon completion of the exposure, the second operating member is actuated to start the film winding operation, and after a lapse of further 170 milliseconds from the actuation of the second operating member, the releasing operation of the subsequent photographing cycle is started.

DESCRIPTION OF THE PREFERRED EMBODIMENT

Figure 1:
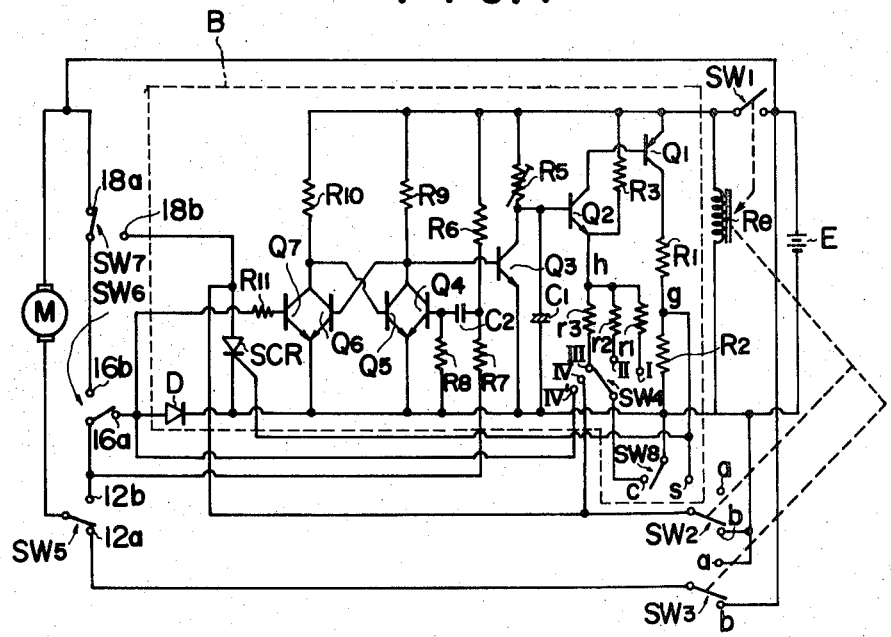
FIG. 1 is a circuit diagram of a network in preferred embodiment of the present invention.

Referring to FIG. 1, the reference character E designates a power source which feeds current to a motor M for energizing the same for performing the shutter releasing operating and then the film advancing or winding and shutter cocking operations.

The switch $SW_1$ is a trigger switch which is closed by depressing the shutter button. When the switch $SW_1$ is closed, the relay Re is connected to the power source, transferring the operating arms or contacts of the switches $SW_2$ and $SW_3$ from contacts $b$ to contacts $a$, respectively.

By closing of the trigger switch $SW_1$, the output of transistor $Q_1$, resistor $R_1$ and resistor $R_2$ which are connected in series are connected to the power source E, and the voltage established at the junction $g$ between the resistors $R_1$ and $R_2$ is transmitted, when the transistor $Q_1$ is in conduction, to the gate of the thyristor SCR as a gate trigger voltage.

The change-over switch $SW_8$ serves for switching between the successive photographing operation where the cycle of operation is successively repeated and the single or one-frame photographing operation when the shutter release button is depressed, the arm of switch $SW_8$ being manually transferable to contact $c$ for successive operation and to contact $s$ for single operation.

The switch $S_4$ serves to determine the number of shots per second, in other words, to determine the period of each photographing cycle, in such a manner that one cycle of photographic operation per second is obtained when the arm of switch $S_4$ engages the contact I, two cycles per second when engaging the contact II, and three cycles per second when engaging the contact III. The contacts IV and IV' are selected concurrently and in such a case where it is not desired to set the camera at any particular cycle of operation for performing the continuous operation in a cycle consisting of the time required for effecting the exposure (not constant) and the time for winding up the film (constant). In the above case, a photographing operation of more than 4 cycles per second is possible where the shutter speed is relatively high.

The resistors $r_i$ ($i = 1, 2, 3$) which are respectively connected to the contacts I, II and III and selected by the switch $S_4$ and the resistor $R_3$ form a circuit for controlling the trigger level of the transistor $Q_2$ the collector of which is connected to the base of the transistor $Q_1$, by the voltage level at the junction between the resistors $r_i$ and the resistor $R_3$.

The variable resistor $R_5$ and capacitor $C_1$ form a CR integration or timing circuit. The capacitor $C_1$ starts charging when the transistor $Q_3$ whose output which is connected in parallel to the capacitor $C_1$ is rendered nonconductive and the charge voltage is applied to the base of the transistor $Q_2$. If this voltage reaches the triggering level of the transistor $Q_2$ determined by the resistors $R_3$ and $r_i$, the transistor $Q_2$ is transferred from an off state to an on state.

Switches $SW_5$, $SW_6$ and $SW_7$ are actuated by the camera mechanism which is driven from the motor M.

Figure 2:
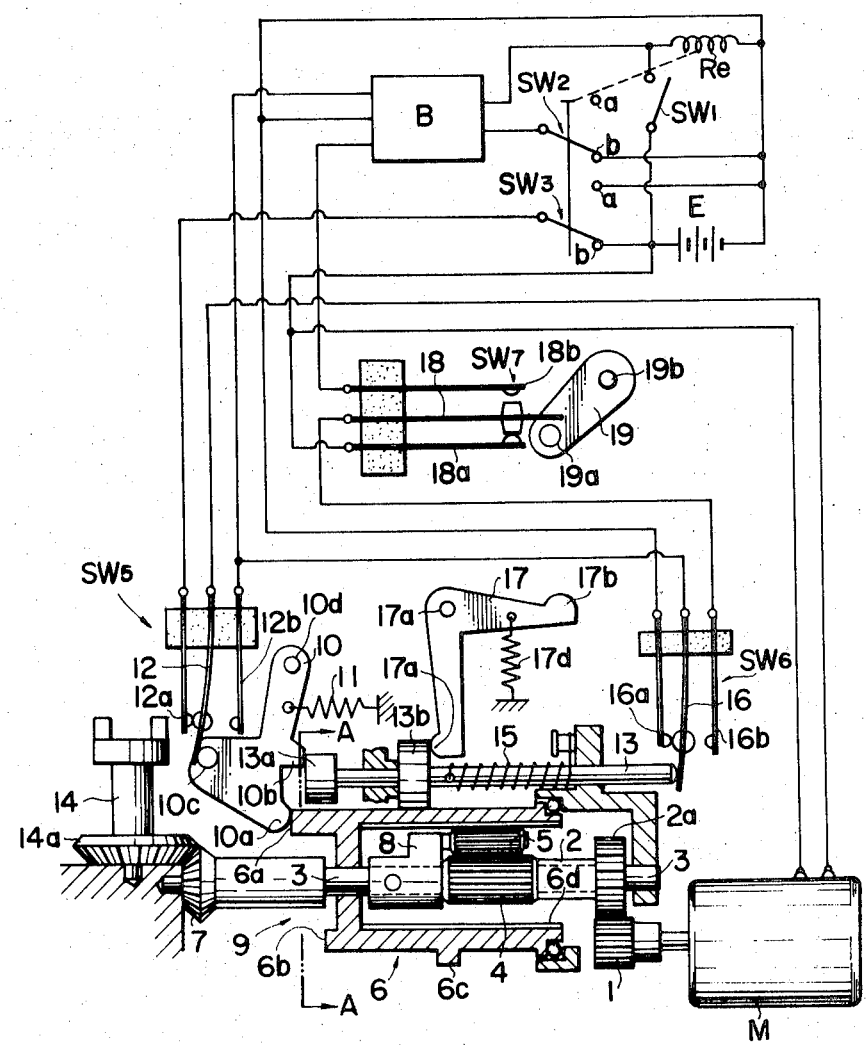
FIG. 2 is a side and schematic view of said embodiment showing the relationship between the motor-driven mechanisms in the motor driven camera and the switch arrangements.

Referring now to FIG. 2, the drive gear 1 which is driven by the motor M is in meshing engagement with a gear 2a which is secured to a sleeve 2. The sleeve 2 has secured thereto a sun gear 4 and is fitted on a shaft 3 rotatable with respect to the body structure of the camera.

Figure 4:
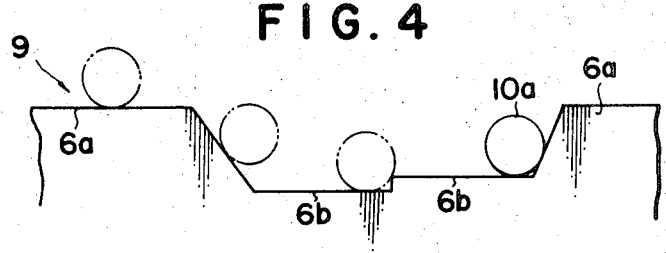
FIG. 4 is a development view of a cylindrically formed cam surface employed in the above embodiment.

The shaft 3 has securely mounted thereon a bracket 8 which rotatably supports thereon a planetary gear 5 which is meshed with the sun gear 4. The shaft 3 has secured at the fore end thereof a bevel gear 7 which is in meshing engagement with a bevel gear 14a which is in turn securely mounted on a film winding shaft 14. The planetary gear 5 meshes with an internal gear 6d which is mounted on a cylinder 6. The cylinder 6 is loosely fitted on the shaft 3 and freely rotatable with respect to the camera body by way of ball bearings or the like, one end face of the cyclinder 6 being formed with a cam surface 9 which is provided with a raised portion 6a and a depressed portion 6b as shown in FIG. 4. The cylinder 6 is further provided on the side wall thereof with a projection 6c.

An operating shaft 13 is supported rotatably and slidably on the body structure of the camera, and is parallel to the shaft 3, and has one end thereof biased in a leftward direction, as seen in FIG. 2, by means of a coil spring member 15 which is secured to the body structure of the camera, to assume the first position shown in the same figure. The righthand end of the operating shaft 13 is engaged with a central operating contact arm 16 of the switch $SW_6$ to connect the movable contact arm 16 with the contact 16a. When the operating shaft 13 is moved rightwardly, the movable contact arm 16 is brought into engagement with the contact 16b. The operating shaft 13 has secured at the lefthand end thereof a cam plate 13a and at the central portion thereof a cam plate 13b which is provided with a projection 13b' for engagement with the projection 6c of the cylindrical member 6.

An operating lever 10 is supported on a shaft 10d rotatable with respect to the camera body and biased to rotate counterclockwise by means of a strong spring 11. The operating lever 10 is provided with a contacting portion 10a which is held in engagement with the cam surface 9 of the cylindrical member 6, with a projection 10b abutted against the cam plate 13a for moving the operating shaft 13 in the rightward direction into a second position against the action of the spring 15, and with a pin member 10c engaged with the central operating contact arm 12 of the switch SW₅. When the contacting portion 10a abuts the projecting portion 6a of the cam surface 9, the operating contact 12 is held in engagement with the contact 12a, and when the contacting portion 10a is in contacting engagement with the lower portion 6b of the cam surface 9, the operating contact 12 is held in contacting engagement with the contact 12b.

A release lever 17 is rotatably supported on the body structure of the camera and biased to rotate in the clockwise direction by means of a weak spring 17d. The release lever 17 is provided with an arm 17a which is constantly held in engagement with the above-mentioned cam plate 13b. The release lever 17 is provided with another arm 17b for, by counterclockwise rotation thereof, releasing the camera into a photographing state and also for releasing the shutter.

Figure 3:
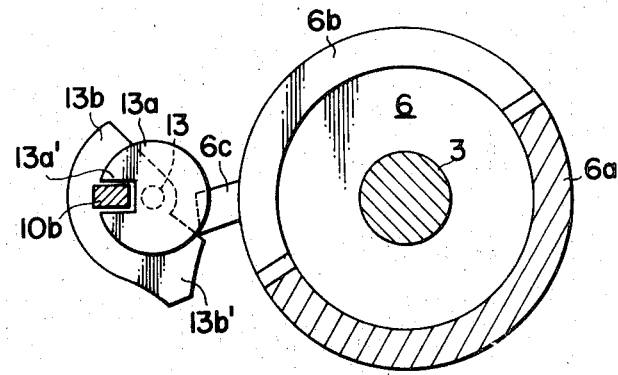
FIG. 3 is a cross-sectional view taken along line A—A of FIG. 2.

When the contacting portion 10a of the operating lever 10 is engaged with the lower portion 6b of the cam surface 9 with the projection 10b of the operating lever pushing the operating shaft 13 from the first position to the second position against the action of the spring 15 for releasing the shutter, the cylindrical member 6 is rotated to bring the projection 6c thereof into engagement with the cam plate 13b as shown in FIG. 3 to rotate the operating shaft 13 in the clockwise direction as seen in the same figure, and the projection 10b of the operating lever 10 enters a recess 13a' formed in the cam plate 13a, allowing the operating shaft 13 to return to the lefthand first position shown in FIG. 2 by the action of the coil spring 15.

The movable contact arm 18 of the switch SW₇ is engaged by the pin member 19a of the lever 19 which is adapted to be rotated in the clockwise direction upon completion of the exposure. The lever 19 is supported on a shaft 19b rotatable with respect to the camera body, and is, for example, in a focal plane shutter, rotated in the clockwise direction in relation with completion of exposure by the rear curtain or blind for bringing the contact arm 18 which has engaged the contact 18a into contacting engagement with the contact 18b.

With the above construction according to the present invention, if the switch SW₁ of FIG. 1 is closed in relation with depression of the release button of the camera, the relay Re is energized and the operating contacts of the relay switches SW₂ and SW₃ are transferred from the b side to the a side, respectively, current being fed from the power source E to the motor M through the above-mentioned switch SW₃ and the switch SW₅ whose operating contact is connected to the contact 12a, for starting rotation of the shaft 2. At this time, the shaft 3 would not rotate due to large load imposed thereon since the shutter cocking has then been completed, and the rotation of the sun gear is imparted to the cylindrical member 6 by way of the planetary gear 5. As a result, the contacting portion 10a of the operating lever 10 is shifted from the raised portion 6a onto the depressed portion 6b of the cam surface 9, while the operating lever 10 is rotated in the counterclockwise direction by the action of the spring 11, with the projection 10b of the operating lever 10 pushing the cam plate 13a for moving the operating shaft 13 rightwardly from the first position into the second position thereof. By this movement, the operating contacts 12 and 16 of the switches SW₅ and SW₆ are transferred from the contacts 12a and 16a to the contacts 12b and 16b, respectively. At this time, the operating contact 18 of the switch SW₇ is connected to the contact 18a, so that the motor is shortcircuited and caused to stop by application of brake. Concurrently, the cam plate 13b rotates the release lever 17 in the counterclockwise direction against the action of the spring 17d, for first releasing the camera and then, in a single lens reflex camera, rotating the reflecting mirror from the viewing position to the picture taking position and adjusting the lens diaphragm to a preselected value before releasing the shutter. If the switch SW₆ is connected to the contact 16a prior to the last described operations by the closing of the switch SW₁, and current is supplied to the circuit B which is enclosed by broken lines in FIG. 1, the circuit including the transistor Q₁ through Q₇ operates in the manner discussed hereinafter. The transistor Q₇ is rendered conductive by the base current flowing through the resistors R₆ and R₇ and supplied by way of the switch SW₆ and resistor R₁₁ while on the other hand the transistor Q₅ is rendered nonconductive. The transistor Q₆ is thus rendered conductive. The transistor Q₄ is held in a nonconductive state since the d-c component to be applied to the base of this transistor is blocked by the capacitor C₂.

As a result, the transistor Q₃ which has the base thereof connected to the collectors of the transistors Q₄ and Q₅ is rendered conductive and the capacitor C₁ is short-circuited, holding the transistors Q₂ and Q₁ in a non-conductive state, with no potential difference across the resistor R₂ and no gate voltage applied to the gate of the thyristor SCR.

However, when the switch SW₆ is switched from the contact 16a to the contact 16b upon release of the shutter as mentioned hereinbefore, the transistor Q₇ is supplied with no bias voltage and rendered nonconductive. At the same time, the transistor Q₄ is rendered conductive by the differentiation circuit formed by the capacitor C₂ and resistor R₈ at the instant when the operating contact 16 of the switch SW₆ is disconnected from the contact 16a, thus holding the transistor Q₆ in a non-conductive state and the transistor Q₅ in a conductive state, maintaining these conditions. As a result, the transistor Q₃ is rendered non-conductive and the capacitor C₁ starts charging. When the voltage applied to either one of the contacts I, II and III of the switch SW₄ reaches a predetermined level, transistors Q₂ and Q₁ are rendered conductive, applying a gate voltage to the gate of the thyristor SCR. A voltage is applied to the diode D in the forward direction when the switch SW₆ is connected to the side of the contact 16a, for biasing the transistor Q₇ in the forward direction. Thus, the circuit consisting of the transistors Q₁ through Q₇, diode D, and capacitors C₁ and C₂ operates as the first operating member, determining the period of each cycle in the successive photographing operation with regard to subjects of normal luminosity.

On the other hand, the second operating member is constituted by the switch SW₇ which is, upon completion of the exposure, disconnected from the contact 18a and connected to the contact 18b by means of the lever 19. The motor M is started again only when both of the first and second operating members are actuated, that is to say, when the switch SW₇ is connected to the contact 18b and a gate voltage is applied to the thyristor SCR, current being fed to the motor through the switch $SW_5$ which is connected to the contact 12b, the switch $SW_6$ which is connected to the contact 16b, switch $SW_7$ which is connected to the contact 18b, and the thyristor SCR. The rotation of the motor M is transmitted to the cylindrical member 6 and the projection 6c of the cylindrical member is brought into engagement with the projection 13b' of the cam plate 13b for rotating the operating shaft 13 in the clockwise direction against the action of the spring 15. When the cam plate 13a is brought into the position shown in FIG. 3, the projection 10b of the cam plate 13a enters the recess 13a' in the cam plate 13a, allowing the operating shaft 13 to return to the first position thereof under the influence of the action of the spring member 15 and the operating contact 16 of the switch $SW_6$ to transfer from the contact 16b to the contact 16a. Then, the lever 19 is allowed to rotate in the counterclockwise direction, returning the operating contact 18 of the switch $SW_7$ into the position connected with the contact 18a. By the operations just mentioned, the transistor $Q_7$ is biased in the forward direction and an off pulse is applied to the base of the transistor $Q_4$ by the differentiation circuit formed by the capacitor $C_2$ and resistor $R_8$, thus inverting all of the transistors $Q_4$, $Q_5$, $Q_6$ and $Q_7$ and rendering the thyristor SCR non-conductive to assume the conditions before the shutter release.

On the other hand, by the connection to the contact 16a of the switch $SW_6$ mentioned hereinabove, the motor M is continuously rotated by current supplied thereto through the switch $SW_5$ which is connected to the contact 12b and through the switch $SW_6$ which is connected to the contact 16a, bringing the contacting portion 10a into engagement with the stepped portion between the lower portion 6b and the projecting portion 6a of the cam surface 9 to increase the load imposed on the cylindrical member 6. Due to this increased load on the cylindrical member 6 the planetary gear 5 is revolved about the sun gear 4 by the rotation of the shaft 2, thus rotating the shaft 3 for winding up the film and cocking the shutter.

Upon completion of the film winding, the load on the shaft 3 is abruptly increased and the cylindrical member 6 is rotated against the load imposed thereon to forcibly bring the contacting portion 10a onto the raised portion 6a of the cam surface 9, rotating the operating lever 10 in the clockwise direction for transferring the switch $SW_5$ from the contact 12b to the contact 12a to return to the state of FIG. 2. Therefore, if the release button is continuously depressed to close the switch $SW_1$, the above-mentioned cycle of operation is repeated successively.

It will be understood from the foregoing description that the thyristor SCR serves for controlling the start of the film winding operation and even if the first operating member is actuated after a predetermined time period, the winding up of the film is not effected unless the second operating member or switch $SW_7$ is actuated after completion of the exposure.

When the switch $SW_4$ is so selected as to connect the contacts IV and IV', the switch $SW_8$ is connected to the contact C representing continuous photographing operation. Under these conditions, if the trigger switch $SW_1$ is closed by pressing down the shutter button, with the shutter speed set at $t_l$, the relay Re is energized to switch the relay switches $SW_2$ and $SW_3$ from the contacts b to the contacts a, supplying current from the power source E to the motor M through the contact 12a of the switch $SW_5$ and the contact a of the relay switch $SW_3$, in the same manner as when the switch $SW_4$ is connected to either one of the contacts I, II and III, for starting the motor M to release the shutter. In relation with release of the shutter, the contacts 12a and 16a of the switches $SW_5$ and $SW_6$ are opened and the contacts 12a and 16b of the switches are closed, for stopping the motor M and releasing the front curtain of the shutter. At this instant, the anode of the thyristor SCR and the anode of the diode D are held at the same negative potential as the power source E by the connection between the contacts IV and IV' of the switch $SW_4$, so that the first operating member which is constituted by the transistor circuit becomes unrelated with the control of the motor M and the thyristor SCR is left in a shortcircuited condition. Therefore, when the lever 19 is rotated in the clockwise direction after completion of the exposure and of the travel of the front curtain, the switch $SW_7$ is switched from the contact 18a to the contact 18b to supply current to the motor M through the contact 12b of the switch $SW_5$, the contact 16b of the switch $SW_6$, contact 18b of the switch $SW_7$, the contacts IV and IV' of the switch $SW_4$ and the contact C of the switch $SW_8$, thereby starting the motor M for effecting the film advance and shutter cocking operations. The projection 6c of the cylindrical member 6 is brought into engagement with the projecting portion 13b' of the cam plate 13b to rotate the operating shaft 13 and the projection 10b is brought into engagement with the recess 13a of the cam plate 13a. The operation after the return to the first position of the operating shaft 13 is same as in the case where the switch $SW_4$ is closed on one of the contacts I, II and III as described hereinbefore.

Therefore, the time period of each cycle of operation just mentioned is variable and consists of the shutter speed $t_l$ which is variable, the time $t_a$ required for winding up the film which is invariable but inherent to the particular kind of camera used, and the time duration between the release operation and the actual shutter release. Thus, the time period of one cycle operation in this case is not constant and largely depends upon the exposure time particularly in low shutter speed operations.

When the switch $SW_4$ is closed on one of the contacts I, II and III and when the switch $SW_8$ is thrown on the side of the contact S which represents single frame operation, the gate and cathode of the thyristor SCR are shortcircuited by way of the switch $SW_8$ and the thyristor SCR is constantly maintained in a blocked condition, so that the motor M is not started even if the switch $SW_7$ is connected to the contact 18b after completion of the exposure.

If the trigger switch $SW_1$ is opened, the relay switches $SW_2$ and $SW_3$ are disconnected from the contacts a and returned to the position connected to the contacts b. At this time, the anode of the thyristor SCR is connected to the negative side of the power source E by way of the contact b of the switch $SW_2$ and thus shortcircuited, so that the motor is started to commence the film winding operation. After the switch $SW_6$ is switched from the contact 16b to the contact 16a during this operation, current flows through the diode D to complete the film winding operation. Upon completion of the film winding operation, the switch $SW_5$ is connected to the side of the contact 12a to stop the motor. Unless the trigger switch $SW_1$ is closed again, no photographing cycle of operation for the subsequent frame is started.

While there have been described and illustrated preferred embodiments of the present invention, it is apparent that numerous alterations and additions may be made without departing from the spirit thereof.

What is claimed is:

1. A motor driven photographic camera including a shutter sequentially movable from a cocked closed position to an open position and then to a closed position and a motor for successively actuating the shutter release and the film advance and capable of automatically successively performing photographic cycles, said camera comprising:

timing means changing from a first state to a second state a predetermined time interval independent of said shutter and following the initiation of said timing means;

first means for initiating said timing means in relation to said shutter opening release operation;

second means transferrable from a first state to a second state in response to the closing of said shutter; and control means responsive only to said first and second means being in their respective second states for actuating said motor to initiate said film winding operation.

2. A motor driven photographic camera as defined in claim 1 wherein said control means comprises a thyristor and means for applying a trigger voltage to the gate of said thyristor when said timing means reaches said second state, and said second means comprises a means for applying to the anode of said thyristor a positive voltage with respect to the cathode thereof, and including means for connecting the motor to a power source through said thyristor.

3. A motor driven photographic camera as defined in claim 2, wherein said timing means comprises an integration circuit having a resistor and a capacitor and operable in response to said means, and said control means includes a transistor which is inverted when said capacitor is charged to a predetermined voltage, a circuit having adjusting means for determining the inversion level of said transistor, a circuit producing a voltage by inversion of said transistor, and means for applying the thus produced voltage to the gate of said thyristor as a gate trigger voltage.

4. A motor driven photographic camera as defined in claim 3, wherein said adjusting means for determining the inversion level of said transistor further comprises means for short circuiting said thyristor across the anode and cathode thereof.

5. A motor driven photographic camera as defined in claim 3, further comprising a manual change-over switch adapted to be switched between a position for connecting said voltage generating circuit and the gate of said thyristor, and a position for shortcircuiting the cathode and gate of said thyristor.

6. A camera including a shutter movable between opened and closed positions and a film advancing and shutter cocking mechanism comprising:

first means actuatable a predetermined timed interval independently of said shutter operation following the initiation of said first means;

second means actuatable in response to the closed position of said shutter; and third means actuatable only in response to said first and second means being concurrently in their actuated states for actuating said film advancing and shutter cocking mechanism.

7. The camera of claim 6, wherein said third means comprises an electric motor, transmission means coupling said motor to said film advancing and shutter cocking mechanism, means including a thyristor connecting said motor to a source of current and means responsive to the actuation of said first means for applying a triggering signal to said thyristor.

8. The camera of claim 7 wherein said second means comprises switch means connected in series with said motor and said thyristor to said current source and closed and opened in response to the closed and opened positions respectively of said shutter.

9. The camera of claim 7, wherein said first means comprises an RC timing network including a resistor and a timing capacitor, means for initiating the timing cycle of said RC network and means responsive to the charge on said capacitor for applying said triggering signal to said thyristor.

10. The camera of claim 9 wherein said charge responsive means comprises a transistor having its input coupled to said capacitor, means for varying the bias on said transistor and means for applying said triggering signal to said thyristor in responsive to the output of said transistor.

11. The camera of claim 7 including means for selectively shortcircuiting said thyristor.

12. The camera of claim 7 including a shutter release member, means for selectively energizing said motor to actuate said shutter release member, and means for braking said motor with the actuation of said shutter release member.

* * * * *